(12) United States Patent
Teich et al.

(10) Patent No.: US 6,516,537 B1
(45) Date of Patent: Feb. 11, 2003

(54) METHOD FOR DRYING AND PRODUCING MICROPOROUS PARTICLES

(75) Inventors: Friedhelm Teich, Edingen-Neckarhausen (DE); Heiner Schelling, Kirchheim (DE); Herbert Köster, Ludwigshafen (DE); Horst Kratzer, Frankenthal (DE); Wolfgang Reichert, Frankenthal (DE); Martin Gall, Mutterstadt (DE); Bernd Ziegler, Kornwestheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/623,856

(22) PCT Filed: Mar. 11, 1999

(86) PCT No.: PCT/EP99/01592

§ 371 (c)(1),
(2), (4) Date: Sep. 11, 2000

(87) PCT Pub. No.: WO99/46023

PCT Pub. Date: Sep. 16, 1999

(30) Foreign Application Priority Data

Mar. 11, 1998 (DE) ......................... 198 10 565

(51) Int. Cl.⁷ ............... F26B 3/00; B01D 12/00; C01B 33/158
(52) U.S. Cl. ............... 34/340; 34/351; 34/505; 252/62; 423/338
(58) Field of Search ............... 516/100, 111; 423/338; 34/339, 350, 351, 505; 252/62

(56) References Cited

U.S. PATENT DOCUMENTS

| | | | |
|---|---|---|---|
| 2,436,403 A | 2/1948 | Reynolds ................ 516/111 X |
| 2,466,842 A | 4/1949 | Elston ......................... 516/82 |
| 2,474,199 A | * 6/1949 | Lechthaler et al. ............ 34/505 |
| 2,485,249 A | 10/1949 | Weir ....................... 516/111 X |
| 2,572,321 A | 10/1951 | Deanesly |
| 2,665,258 A | * 1/1954 | Lebeis, Jr. .............. 516/111 X |
| 2,868,280 A | 1/1959 | Sargent et al. ............. 159/47.1 |
| 2,956,957 A | 10/1960 | Armstrong et al. ........... 516/82 |
| 3,672,833 A | 6/1972 | Teichner et al. |
| 3,872,217 A | 3/1975 | Merz et al. .................. 423/338 |
| 4,432,956 A | * 2/1984 | Zarzycki et al. ............ 423/338 |
| 4,447,345 A | * 5/1984 | Kummermehr et al. ....... 252/62 |
| 4,667,417 A | 5/1987 | Graser et al. ..................... 34/9 |
| 4,741,807 A | 5/1988 | Wilhelm et al. ......... 196/14.52 |
| 4,820,537 A | 4/1989 | Katz ......................... 426/481 |
| 5,032,555 A | 7/1991 | Yamanis et al. ............ 501/105 |
| 5,211,733 A | 5/1993 | Fukao et al. ................... 65/17 |
| 5,565,142 A | * 10/1996 | Deshpande et al. ...... 516/100 X |
| 5,676,845 A | 10/1997 | Derleth et al. .............. 210/757 |
| 5,736,118 A | 4/1998 | Derleth et al. .............. 423/659 |
| 5,738,801 A | 4/1998 | Ziegler et al. ................. 252/62 |
| 6,315,971 B1 | * 11/2001 | Wallace et al. ............. 423/338 |
| 6,438,867 B1 | * 8/2002 | Teich et al. ............... 34/340 X |

FOREIGN PATENT DOCUMENTS

| | | |
|---|---|---|
| DE | 1 030 312 | 11/1958 |
| DE | 1 667 568 | 7/1971 |
| DE | 2 103 243 | 8/1972 |
| DE | 35 32 957 | 3/1987 |
| DE | 247 610 | 7/1987 |
| DE | 44 05 202 | 9/1994 |
| EP | 0 331 852 | 9/1989 |
| EP | 0 486 004 | 5/1992 |
| GB | 773549 | 4/1957 |
| GB | 1 368 711 | 10/1974 |
| WO | WO 95/06617 | 3/1995 |

OTHER PUBLICATIONS

R.J. Ayen, et al., Reviews in Chemical Engineering, vol. 5, Nos. 1–4, pp. 157–198, "Metal Oxide Aerogel Preparation By Supercritical Extraction," 1988.

R. Weiss, et al., Ullmanns Encyklopädie der technicschen Chemie, vol. 21, pp. 439, 458–472, and 475, Siliciumdioxid, 1982.

J.F. White, Industrial and Engineering Chemistry, vol. 31, No. 7, pp. 827–831, Silica Aerogel, Jul. 1939.

J.F. White, American Institute of Chemical Engineers, pp. 435–447, "Manufacture of Silica Aerogel—Description of Process And Heat Transfer Problems," 1942.

R.C. Reid, et al., The Properties of Gases and Liquids, pp. 601–627, "Surface Tension," 1977.

\* cited by examiner

Primary Examiner—Richard D. Lovering
(74) Attorney, Agent, or Firm—Oblon, Spivak, McClelland, Maier & Neustadt, P.C.

(57) ABSTRACT

In a process for drying microporous, fluid-containing particles, the fluid-containing particles to be dried are fed as a moving bed countercurrently to a drying fluid, the interfacial tension of the fluid being reduced in comparison with the interfacial tension of the fluid at room temperature, at near-critical to supercritical pressure of the fluid, preferably to a value in the range from 0 to ¹⁄₁₀, in particular from 0 to ¹⁄₂₀, of the interfacial tension at room temperature. Furthermore, microporous, three-dimensionally networked particles are prepared by a process comprising preparation of microporous particles containing pore liquid, exchange of the pore liquid in the particles for a fluid and drying of the fluid-containing particles, the exchange and drying being carried out in the moving bed by the countercurrent method.

12 Claims, 1 Drawing Sheet

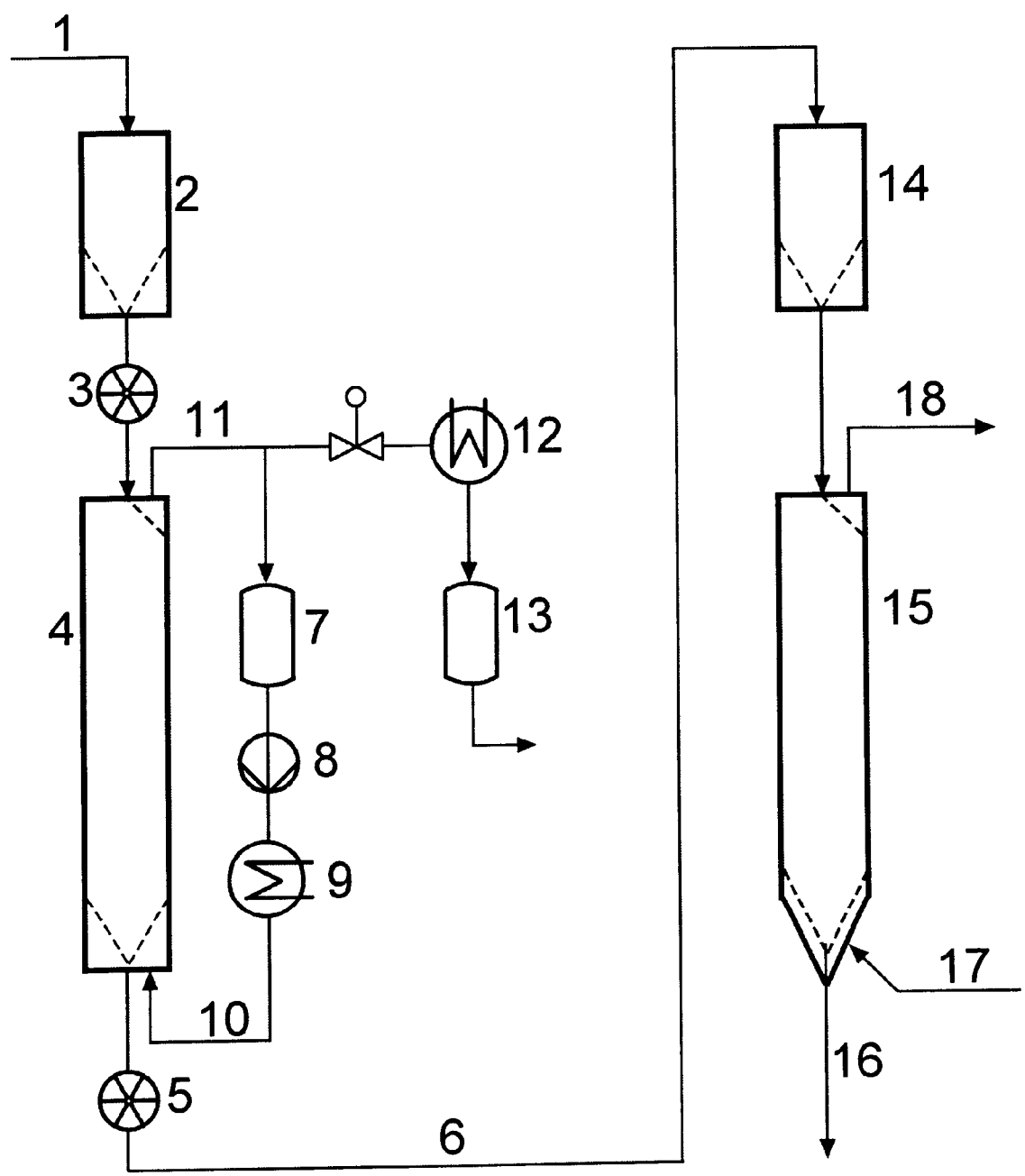

METHOD FOR DRYING AND PRODUCING MICROPOROUS PARTICLES

This applications is a 371 of PCT/EP99/01592 filed Mar. 11, 1999.

The present invention relates to a process for drying microporous, fluid-containing particles and a process for the preparation of microporous, three-dimensionally networked particles in which this drying process is used.

It is known that hydrogels, e.g. silica hydrogels which can be prepared by precipitating gels from waterglass, can be dried under supercritical conditions to give microporous, three-dimensionally networked silica particles. In the supercritical drying, the interfacial tension of the fluid contained in the microporous particles is completely or substantially eliminated with the object of substantially avoiding shrinkage of the microporous particles during drying, since characteristic properties of the microporous particles are wholly or partly lost on shrinkage. In the case of gels, such a product obtained by supercritical drying is referred to as an aerogel. In contrast to conventional drying without special precautions, in which the gels suffer a large volume contraction and xerogels form, only a small volume contraction (<15%) thus takes place during drying close to the critical point.

The prior art for the preparation of aerogels by means of supercritical drying is described in detail in, for example, Reviews in Chemical Engineering, Volume 5, No. 1–4, pages 157–198 (1988) in which the pioneering work by Kistler is also described.

The literature also discloses the continuous preparation of aerogel powders, cf. for example U.S. Pat. No. 2,572,321, DE-C-1 030 312, U.S. Pat. No. 2,868,280 and U.S. Pat. No. 5,032,555. A suspension of a finely divided, fluid-containing gel is brought to supercritical pressure with respect to the fluid phase of the gel by means of a pump. To reach the supercritical temperature of the fluid phase of the gel, the suspension flows through a heat exchanger and is then released via a pressure control valve. The aerogel is deposited in cyclones and on filters. The disadvantage of the powder method is that the total amount of liquid required for suspending has to be brought to a supercritical temperature, which results in a corresponding energy demand. Further disadvantages are the abrasion in the expansion valve and the dust production by the product. Apart from this, special filter apparatuses, such as expensive, encapsulated belt filters, etc., have to be used for the preparation of the finely divided, fluid-containing gel in any wash or salt-removal step and, if a hydrogel is present, in an exchange of the water for, for example, flammable fluid.

In addition to the continuous preparation of aerogel powders, the continuous preparation of silica gel is also known, cf. in this context U.S. Pat. No. 2,436,403, U.S. Pat. No. 2,485,249, U.S. Pat. No. 2,466,842 and U.S. Pat. No. 2,956,957 and Ullmanns Encyklopädie der technischen Chemie, 4th revised edition, Volume 21, pages 460–461. The gels are obtained, inter alia, also in bead form.

WO-A-95 06 617 relates to hydrophobic silica aerogels which are obtained by reaction of a waterglass solution with an acid at a pH of 7.5 to 11, substantial removal of ionic components by washing with water or dilute aqueous solutions of inorganic bases while maintaining the pH of the hydrogel in the range from 7.5 to 11, displacement of the aqueous phase contained in the hydrogel by an alcohol and subsequent supercritical drying of the alcogel obtained.

A process for the preparation of silica aerogel on the pilot scale has been described by White in Industrial and Engineering Chemistry, Volume 31 (1939), No. 7, pages 827–831, and in Trans. A. J. Chem. E. (1942), 435–447. The process comprises the following steps, which are all carried out batchwise: preparation and aging of silica hydrogel, comminution of the hydrogel to give granules, separation of salt from the gel formed, exchange of the water in the gel for alcohol, introduction of the gel, dried by allowing to drip off, into a pressure container, heating of the pressure container, reduction of the pressure to atmospheric pressure, evacuation of the pressure container and subsequent removal of the aerogel. The disadvantage of this process is that all steps are carried out batchwise and are therefore very time-consuming, labor-intensive and expensive. White mentions no continuous process for the preparation of granules and for salt removal. In the water/alcohol exchange, White prefers, for the liquid phase, a procedure to be described as covering with the layer/impregnating/drainage and which constitutes intermittent treatment of the solid bed with liquid. White believes constant flowthrough to be less economical.

According to U.S. Pat. No. 3,672,833, the known processes for removing salt from gels and for exchanging water for other solvents are extremely tedious and hence expensive processes. In order to overcome this, gel preparation from lower alkyl orthosilicates is proposed there. However, these require a great deal of energy for their preparation.

EP-B-0 331 852 discloses a continuous process for extracting caffeine from green coffee beans, in which, the green coffee beans are passed as a moving bed countercurrently to supercritical carbon dioxide. DE-A- 35 32 957 describes an apparatus in which a particulate feedstock in the moving bed is subjected to countercurrent extraction with a solvent in the liquid or supercritical state, for example with supercritical carbon dioxide. The only specifically mentioned extraction is that of rapeseed oil from rape.

It is an object of the present invention to provide an improved, more economical process for drying microporous, fluid-containing particles and an improved, more economical process for the preparation of microporous, three-dimensionally networked particles with the use of the drying process, the abovementioned disadvantages of the prior art being avoided.

We have found that this object is achieved, surprisingly, if the fluid-containing particles to be dried are fed as a moving bed countercurrently to a drying fluid which is present under at least near-critical conditions. We have also found that an essentially continuous preparation of microporous, three-dimensionally networked particles is possible if, in addition to the drying process, any washing and/or salt removal or fluid exchange in the pores of the microporous particles and removal of sorbed gases or substances in the moving bed are also carried out by the countercurrent method. The present invention therefore relates to a process for drying microporous, fluid-containing particles, in which the fluid-containing particles to be dried are fed as a moving bed countercurrently to a drying fluid, the interfacial tension of the fluid being reduced in comparison with the interfacial tension of the fluid at room temperature, at near-critical to supercritical pressure of the fluid, preferably to a value in the range from 0 to $\frac{1}{10}$, in particular from 0 to $\frac{1}{20}$, of the interfacial tension at room temperature.

The range in which the present invention is preferably applied can be defined by the fact that the microporous particles do not lose their properties during the drying; this means that, for example, the apparent density of the product does not significantly increase, that the thermal conductivity of the product does not significantly increase and that preferably no shrinkage above 15%, in particular no shrinkage above 10%, occurs. This circumstance can also be described in terms of the fact that the aerogel may not become a xerogel (gel dried at atmospheric pressure).

The abovementioned interfacial tension is determined as described in "The Properties of Gases and Liquids" by Reid, Brausnitz, Sherwood, McGraw Hill, 1977, page 601 et seq., the interfacial tension at the temperature (and pressure) to be tested be ing measured and being compared with that at room temperature and atmospheric pressure under otherwise identical conditions.

In a further embodiment, the present invention relates to a process for the preparation of microporous, three-dimensionally networked particles by (a) preparation of microporous particles containing pore liquid or fluid, (b) if required, washing off and/or removal of salt from the particles obtained in stage (a) and containing pore liquid, by means of a solvent and/or water, (c) if required, partial or complete exchange of the pore liquid or of the water or of the solvent in the particles for a fluid to obtain microporous, fluid-containing particles, (d) drying of the microporous, fluid-containing particles and (e) if required, separation of sorbed gases and/or substances from the dried particles from stage (d).

In the novel process, stages (b), (c), (d) and (e), if they are carried out, are carried out in a moving bed by the countercurrent method, by passing the particles obtained from stage (a) countercurrently to a solvent stream and/or water stream in stage (b), passing the particles countercurrently to the fluid in stage (c), passing the fluid-containing particles to be dried countercurrently to a drying fluid in stage (d), the interfacial tension of the fluid being reduced, at near-critical to supercritical pressure of the fluid, to 0 to 1/20 of the interfacial tension of the fluid at room temperature, and the dried particles being passed countercurrently to an inert gas stream in stage (e). Preferred embodiments of the invention are described in the following description, the subclaims, the Figure and the Example.

BRIEF DESCRIPTION OF THE DRAWINGS

The only Figure of the attached drawing schematically shows an apparatus which is suitable for carrying out drying and separation of sorbed gases or substances according to a preferred embodiment of the invention.

The microporous, fluid-containing particles which are suitable for the drying according to the invention are not subject to any particular restrictions per se. All particles, solids, structures or granules which are at least partly, preferably wholly, microporous and contain a fluid in the pores are suitable. Suitable particles are, for example, gels which consist of inorganic or organic materials or of polymer material, for example of inorganic oxides or hydroxides, such as boric or silicic acid, oxides or hydroxides of the metals titanium, molybdenum, tungsten, iron or tin, alumina or organic gels, such as agar-agar, gelatin or albumin. The novel process is particularly suitable for drying silica gels. It is possible to use gels which contain compounds having a critical temperature of less than 350° C. or blends or mixtures thereof, preferably water and/or liquid organic compounds, as fluid. Suitable fluids include all compounds which are mentioned below in the description of the drying fluids. Particularly suitable fluids are water, $C_1$–$C_6$alkanols or mixtures thereof, methanol, ethanol, n-propanol and isopropanol being preferred. Isopropanol is most preferred. Depending on the fluid present in the pores, for example, the terms hydrogels and alcogels are used. The novel process is most frequently used for drying of silica gels which contain water, the abovementioned liquid organic compounds or mixtures thereof as fluid.

In a preferred embodiment of the invention, the microporous, fluid-containing particles contain from 50 to 97, in particular from 80 to 90, % by weight, based on the total weight of the particles under standard conditions (pressure of 1 bar, temperature of 25° C.), of fluid. The particle diameter is from 1 to 15 mm, in particular from 2 to 6 mm. Macropores, mesopores and/or micropores are present in the particles. The microporous particles to be dried may have any desired shape, e.g. beads (spheres) or polygonal shapes. The novel drying process is also suitable for drying microporous, fluid-containing particles or structures which may have a certain regular arrangement of the building blocks. Other suitable particles are, for example, structures crystallized in the presence of thermally degradable templates, nanostructures whose regular arrangement is self-organized, or nanocomposites and their precursors or clathrates. The microporous particles may also comprise a microporous top layer provided with a specific dopant on a nonporous support. Catalysts or compounds which have acquired chemically reactive centers by impregnation or modification or are impregnated or modified during the drying are also suitable. Preferably, aerogels are formed after drying. If the particles to be dried contain no fluid suitable for the drying according to the invention, this can be exchanged before the drying for a suitable fluid or a more suitable fluid. According to the invention, some microporous particles containing water as fluid can thus be dried. If, however, it is desired to avoid the high critical temperatures and pressures for water as drying fluid, either a water-miscible drying fluid (miscible at least under the drying conditions), for example an alcohol, can be used or the water contained in the hydrogel is wholly or partly exchanged for a fluid more suitable for the drying, for example an alcohol. Exchange and drying can also be carried out simultaneously.

Preferably used drying fluids are substances which are stable up to their critical temperature. They may be inert with respect to the particles to be dried but may also modify the particles by reaction with their surface and possibly additionally reduce the interfacial tension as a result. Drying fluids whose critical data are not too high are expediently used, in order to avoid more expensive apparatus. Suitable drying fluids are ammonia, sulfur dioxide, nitrogen dioxide, sulfur hexafluoride; alkanes, such as propane, butane, pentane, hexane and cyclohexane; alkenes, such as $C_1$–$C_7$-n-alkenes, isoalkenes, neoalkenes or secondary or tertiary alkenes, e.g. ethene or propene; alkanols such as methanol, ethanol, n-propanol, isopropanol or butanols; ethers, such as dimethyl ether, diethyl ether or tetrahydrofuran; aldehydes, such as formaldehyde or acetaldehyde; ketones, such as acetone; esters, such as the methyl, ethyl, n-propyl or isopropyl ester of formic, acetic or propionic acid; amines, such as mono-, di- and trimethylamine or ethylamine or n-propylamine or isopropylamine or mixed alkylated amines thereof; and mixtures of two or more of these fluids. Among the stated organic compounds, $C_1$–$C_6$-alkanols, $C_1$–$C_6$-ethers, $C_1$–$C_6$-ketones, $C_1$–$C_6$-aldehydes, $C_1$–$C_6$-alkanes, $C_1$–$C_6$-alkenes, $C_1$–$C_6$-esters or $C_1$–$C_6$-amines are preferred. Most preferred are $C_1$–$C_3$alkanols, in particular isopropanol. In principle, halogenated hydrocarbons are also suitable, but these are avoided owing to the chosen material and environmental requirements. It is also necessary to try to avoid media having high critical temperatures or high pressures, such as water. In addition to said drying fluids, supercritical carbon dioxide is also suitable as a drying fluid. Particularly because of its advantageous critical temperature of 31° C., this is especially suitable for thermally sensitive substances.

In general, the choice of the drying fluid depends on various aspects. If it is desired to establish near-critical conditions, inter alia the thermal stability of the particles to be dried or of the end product determines the choice of the drying fluid and thus also limits the critical temperature of the drying fluid. In addition, possible fluid recovery after the drying, the toxicological safety, the miscibility with the fluid in the particles to be dried, product properties and safety data may play a role in the choice of the drying fluid. It is also possible to add to the drying fluid one or more components which contain one or more functional groups which are converted, absorbed or adsorbed on the surface of the particles to be dried. Consequently, uniform covering, coating or impregnation of the particles to be dried can simultaneously be achieved during the drying. A modified use of the drying fluid is, for example, the addition of ammonia to isopropanol as drying fluid in order, for example, to be able to dry acidic hydrogels without isopropanol decomposing. In the case of methanol as drying fluid, the addition of ammonia prevents the formation of an undesirably large amount of ether. For example, when methanol is used as drying fluid, isopropanol or isobutanol can be added for rendering a silica gel hydrophobic. For chemical modification, for example for removing traces of water with propene, or for physical modification of the particles to be dried, suitable components can generally be added before, during or after the critical temperature of the fluid has been reached.

It is sufficient if the drying fluid is miscible with the fluid contained in the particles to be dried, at least under the conditions present during the drying. Advantageously, however, the drying fluid used is the same as the fluid contained in the microporous particles. Examples of fluids/drying fluids which are completely miscible only under the drying conditions are mixtures of water with higher alcohols or aromatics.

According to the invention, the fluid-containing particles to be dried are fed as a moving bed countercurrently to the drying fluid. A suitable ratio or a suitable setting of the material streams and flow rates of drying fluid and particles to be dried for producing and maintaining the moving bed can be determined by those skilled in the art in conventional experiments. This setting depends, inter alia, on the height of the moving bed, on the internal mass transfer and heat transport of the particles to be dried and on the fluidization point, i.e. on the density and particle size or particle size distribution of the microporous particles to be dried.

The drying fluid stream is preferably adjusted so that no fluidization occurs in the moving bed and there is therefore no undesired separation. The back-mixing on the drying fluid side is the lowest if fluid velocities just below the loosening point of the moving bed are employed at every height or in every zone of the moving bed. Depending on the particle distribution and characteristics (shape, porosity, etc.) of the particles to be dried, it may be expedient to remove or to add fluid at a suitable point in the moving bed, for example via slit sieves. If two velocities of the drying fluid are used alternately, for example in the case of small particle sizes or a small particle/fluid density difference, the drier completely filled with particles to be dried being loaded and emptied only in portions when the drying fluid stream is reduced, it should be ensured, in the heat introduction phase (during which the bed is pressed against the roof of the drier), that the pressure build-up due to the higher drying fluid flow rate does not exceed the mechanical load capacity of the particles to be dried. If it is not intended to cover the entire density gradient in the moving bed, it is possible, for example in the case of isopropanol, to discharge the particles to be dried from the moving bed at a drying fluid density of about 300 g/l and to apply the remainder of the energy or the final temperature increase only in the connecting line to the discharge pressure lock, for example by pneumatic drying, or only batchwise in the discharge pressure lock. All types of pumps which are suitable for conveying particulate material are suitable as a feed and discharge member for the microporous particles, modified concrete pumps having proven particularly useful. On decrease of the pressure in a discharge pressure lock, energy can be recovered by connecting said lock to a feed pressure lock.

In a preferred embodiment of the invention, the drying is carried out by a procedure in which first the particles to be dried, preheated and at atmospheric pressure, are fed via a pressure lock into the drying space, in which they flow in the form of a moving bed countercurrently to the drying fluid. After the near-critical or supercritical conditions of the drying fluid have been reached, the particles then leave the drying space via a second pressure lock, after which they are dried after the pressure has been let down and the two-phase region circumvented. The drying fluid is preferably circulated.

The interfacial tension of the fluid contained in the pores of the particles to be dried can also be reduced by adding surfactant substances or prior modification of the microporous, fluid-containing particles by, for example, silanization, organic esterification or etherification or, in the case of silica gels, by siloxanization of vicinal silane-mono-/di-/triols of the internal and external surface.

In a further embodiment, the present invention relates to a process for the preparation of microporous, three-dimensionally networked particles by the stages (a) to (e) defined above.

The preparation of microporous particles containing pore liquid can be carried out continuously by the process known to those skilled in the art.

A washing step for the particles obtained in stage (a) can be carried out if undesired components, such as unconverted starting material or impurities of the starting material, are to be removed. For this purpose, the particles from stage (a) in the form of a moving bed are fed countercurrently to a solvent, preferably a water-miscible one. A step (b) for removing salts from the microporous particles containing pore liquid or solvent can be provided before, after or simultaneously with the washing or alone (without washing) if the particles contain undesired salts. If such a step is used, it is carried out continuously by passing the particles obtained from stage (a) or the particles obtained after the washing, in the form of a moving bed, countercurrently to a stream of water. The moving bed is established in step (b) under the conditions as stated above in the description of the drying, those features which are required in the drying to be able to operate under the near-critical conditions of the drying fluid being dispensed with. All desired degrees of washout and degrees of salt removal can be established. The washing step and/or salt removal step are accelerated by increasing the temperature, i.e. the higher the temperature, the more rapidly they take place. They are preferably carried out at elevated temperatures, the upper limit of the temperature being determined by decomposition, agglomeration, dissolution of the liquid, etc. of the particles to be washed or to be freed from salts. For example, some silica gels can be freed from salts at about 80° C. To improve the cross-mixing, pulsation of the solvent stream or water stream can also be provided. Furthermore, the moving bed can be loosened by bubbling in gas, e.g. air. In stage (b), preferably hydrogel is freed from salts after aging.

In stage (c), some or all of the pore liquid contained in the particles, in particular from 97 to 99%, is exchanged for a fluid. Suitable fluids are the fluids described above in the description of the microporous, fluid-containing particles. Analogously to salt removal, elevated temperatures promote the exchange. Regarding the suitable temperature, the statements made above under stage (b) are therefore applicable. Likewise, the statements made above under stage (b) are applicable to the setting up of the moving bed. Exchange of the pore liquid can of course be dispensed with if the particles obtained in stage (a) or (b) already contain a suitable fluid. It is also possible, in stage (c), for the pore liquid in the particles first to be exchanged for a liquid which is miscible with the pore liquid but is not a fluid suitable for the drying. In this case, the liquid miscible with the pore liquid is subsequently exchanged for a fluid suitable for the drying. In stage (c), it is also possible, in the case of the moving bed, to feed in material streams of different purities at different heights. Furthermore, a combination of the exchange step with separation of fines or, for example, of an adhering oil from the gelling material is possible and may save a separate classification step. Furthermore, under appropriate kinetic conditions, the combination of washing and/or salt removal in stage (b) and exchange stage (c) in one apparatus may be advantageous. If traces of the original pore liquid present problems in the exchanged particles, said traces can be removed, for example, in the lowermost zone of the exchange moving bed under special conditions, for example by a reaction. This is also possible by addition of suitable components at the bottom of the exchange moving bed; combination with impregnation of the microporous particles is also possible.

In stage (d), the microporous, fluid-containing particles are dried. The drying is carried out in the moving bed countercurrently to the drying fluid, as described above in the case of the novel drying process.

In stage (e), the dried particles are, if required, separated or freed from absorptively and/or adsorptively bound gases or substances. This step is carried out continuously in the moving bed by the countercurrent method, the dried particles being fed countercurrently to an inert gas stream, preferably at reduced pressure. Suitable inert gases are nitrogen, carbon dioxide or noble gases. Under certain circumstances, air or stack gas can also be used. Regarding the adjustment of the moving bed, the statements made above under stage (b) apply analogously. It is also possible to add to the inert gas phase a component which reacts with or is absorbed or adsorbed by the dried particles. The separation step can, if required, be improved by displacement adsorption with a more strongly adsorbing substance. In some cases, the removal of absorptively or adsorptively bound substances/gases can also be carried out exclusively by applying reduced pressure.

Stage (e) may be followed by a continuous final treatment step in which the microporous, three-dimensionally networked particles are brought into the desired form, for example by milling, sieving or mixing with additives suitable for the application. It is also possible to provide the resulting particles with a hard coat, for example by means of sintering, in order to increase their mechanical strength.

The microporous, three-dimensionally networked particles obtained are the same particles as have been described above in the case of the novel drying process, these particles having additionally been freed from undesired impurities compared with the particles mentioned above.

The microporous particles obtainable by means of the novel process can be used in many industrial areas. Inter alia, they are suitable for the production of transparent or opaque thermal insulation materials (in certain circumstances as a substitute for chlorofluorocarbon-containing materials). They are also used as catalysts and catalyst supports, adsorbents, electrodes (in the form of carbon aerogels obtained by coking microporous polymers, for example in capacitive energy stores when impregnated with electrolyte), membranes, Cerenkov detectors, superlight sponges for inclusion/storage or gelling agents/thickeners/thixotropic agents for liquid ropellants for spaceflight, as insecticides, sinterable intermediates for ceramics or high-purity optical fibers, piezoceramic oscillators in ultrasonic transmitters, in acoustic antireflection layers, as dielectrics, as carriers for fluorescent dyes, as dulling agents, as additives in lubricants, rubber and sealants, in composite materials and in surface coatings and finishes.

The Figure schematically shows an apparatus which is suitable for carrying out stages (d) and (e) of the novel preparation process. Gel to be dried, e.g. alcogel having isopropanol as pore fluid, is introduced via feed line 1 into a chamber lock 2. From there, the alcogel passes via star feeder 3 into the drying apparatus 4. In the drying apparatus 4, the alcogel to be dried is passed in the form of a moving bed countercurrently to an isopropanol stream. This isopropanol stream, which constitutes the drying fluid stream for drying/heat introduction, is conveyed at about 50 bar by means of a pump 8 into a heat exchanger 9 and is heated there to above 280° C. Via line 10, the hot isopropanol is fed in at the bottom of the drying apparatus 4, via a flow distributor (not shown). The isopropanol leaves the drying apparatus 4 at the top via line 11 and flows back to the storage container 7. The pressure in the fluid circulation is kept constant by means of a relief valve before the heat exchanger 12, i.e. isopropanol separated thermally from the gel is released, cooled in the heat exchanger 12 and collected in the container 13. After near-critical to supercritical conditions of the fluid have been reached in the gel, the latter is transferred from the drying apparatus 4 via star feeder 5 and line 6 into a lock 14. There, any final temperature increase is effected and let-down and evacuation are carried out. The aerogel is then discharged into a silo-like apparatus 15 for the removal of sorbed gases and/or substances. A nitrogen stream at reduced pressure flows from below toward the aerogel as a moving bed in the apparatus 15. The aerogel freed from sorbed gases/substances is removed via line 16. The nitrogen stream is fed in at the bottom of the apparatus 15 via line 17 and is removed at the top via line 18.

The present invention is furthermore distinguished by the following features and has the following advantages:

Since particles the size of granules instead of powder as in the prior art are employed, there are no problems with the handling of dust. Nevertheless, it is possible, if desired, also to obtain powder by milling the resulting particles. Moldings are also obtainable in some cases by sintering granules and powder.

The continuous procedure for the process steps permits better constancy of quality compared with batchwise process steps.

In contrast to a fixed-bed process, smaller containers can be used because there are no dead times for loading and unloading and an extension of a temperature transition zone of in some cases considerable length from the fixed bed is not required. Consequently, the amount of flammable liquids in a factory may be minimized.

It was surprising that very advantageous demands (i.e. required fresh water volume for obtaining a specific volume of hydrogel from which salts had been removed) could be achieved in the salt removal in the moving bed by the countercurrent method. This is all the more surprising since, as mentioned above, the salt removal step was described in the literature as being very complicated and tedious, for which reason U.S. Pat. No. 3,672,833 proposed the hydrolysis of lower alkyl orthosilicates for the preparation of silica aerogels.

In the salt removal step in stage (b) and exchange step in stage (c), all desired degrees of salt removal and exchange can be established in the novel countercurrent moving bed method. If these steps were to be carried out in a fixed bed, inter alia axial gradients of the components to be removed would occur there.

Surprisingly, it was found that the moving bed process can be used without problems for washing/salt removal, exchange and drying even in the case of an unstable density gradient on the fluid side, i.e. it is possible to use a procedure in which the microporous particles readily move from the top downward without conveying means. To maintain the unstable density gradient, the density difference is spread over a sufficient length of the moving bed and a minimum relative velocity is set. Furthermore, it was surprising here that an acceptable specific demand of displacement component is then achieved in comparison with a fixed-bed exchange operated batchwise.

It was surprising that, in the novel drying process, the density gradient between the lower and the upper region of the drying apparatus can be stabilized, i.e. a hot drying fluid having a density of, for example, 100 g/l can be fed in at the bottom and a cooled drying fluid having a density of 780 g/l can be removed at the top of the moving bed.

In the drying, too, the density difference is preferably spread over a sufficient length of the moving bed in order to maintain an unstable density gradient. A sufficient minimum relative velocity ensures direct heat introduction. It was surprising that, during the drying, scarcely any more fines was produced than in the process operated batchwise.

Compared with a process operated batchwise, continuous drying is also advantageous for the following reasons. Thus, the pressure-resistant volume of the drier is smaller. No temperature and/or pressure cycling occur. The energy requirement is uniform and therefore smaller heat exchangers and a smaller pump are required. This need not be heat-resistant if the heat introduction is effected directly in a straight pass. Since the particles to be dried are fed quasi-continuously into the pressure space, its conveying members and the fittings may have smaller dimensions. The drying in the moving bed may simultaneously result in dust separation from the product. The drying fluid and the particles to be dried are to be subjected to thermal stress at the maximum temperature for only a comparatively short time. The maximum amount of hot drying fluid present is thus minimized.

The continuous step for removing sorbed gases/substances is advantageous compared with a corresponding batchwise step because, for example, less nitrogen is required and correspondingly constantly smaller gas streams are consumed. Consequently, the flares and the waste gas scrubbers can be designed smaller.

The example which follows and constitutes a preferred embodiment of the invention additionally illustrates the invention.

EXAMPLE

Stage (a): Hydrogel Preparation

Silica hydrogels were prepared according to DE-A-21 03 243, DE-A-44 05 202 and DE-A-16 67 568. At least 95% by volume thereof had a bead diameter of from 2 to 12 mm. Coarse material was separated off here by means of a wire rod screen immersed in water. Next, silica hydrogels were subjected to continuous hydraulic classification prior to salt removal.

Stage (b).: Salt Removal

Apparatus

Two salt-removal moving beds, each 11 m high and 800 mm wide, were equipped with sampling points at different heights. Fresh water was fed in at the bottom via distributors and salt water was removed at the top via slit-sieve cartridges. The cellular wheel lock at the bottom adjusted the solid streams. At low flow rates and in the case of gels which tend to adhere, it was possible to improve the cross-mixing in the bed by means of static mixers.

Procedure

In each salt-removal moving bed, a stream of about 2450 l/h of water was fed from below countercurrently to a downward moving stream of about 510 l/h of classified hydrogel from the preceding stage (about 150 of the 510 l thereof are accounted for by the void volume). After about 30 hours at the latest, a steady state had been established in the moving bed. The conductivity of the samples which were taken at the various points along the bed no longer showed any changes. A conductivity of more than 1 milli-Siemens/cm was measured in the overflow. The water in the void volume of the hydrogel freed from salt had a conductivity of 40 micro-Siemens/cm, which corresponds to a sodium content of about 1% by weight in the gel.

Stage (c): Water/Alcohol Exchange

Apparatus

The liquid exchange step was carried out in an 11 m high 500 mm wide moving bed which had a similar design to that used for salt removal. The alcohol was fed in above the cellular wheel lock by means of a distributor. The alcohol/water mixture was able to flow away via slit sieves. At low flow rates and in the case of gels which tend to adhere, it was possible to improve the cross-mixing in the bed by means of static mixers.

Procedure

A stream of about 1400 l/h of isopropanol was fed countercurrently to the stream of about 1000 l/h of hydrogel from stage (b), from which salts had been removed. After 10 hours at the latest, a steady state had been established in the moving bed. The densities of the samples from the various sampling points along the bed no longer showed any change. The residual water content of the gel which was discharged at the bottom of the moving bed was less than 1% by weight. The specific volume ratio based on the isopropanol demand was thus 1.4:1.

Stage (d): Drying

Apparatus

An apparatus as shown schematically in the Figure was used. The drier used here was an 8 m high pressure container having an internal diameter of 500 mm. The gel was introduced via a pressure lock or two pressure locks alternately and a star feeder at the top of the drier moving bed and was discharged at the bottom of the drier via a relief lock or two relief locks (alternately).

Procedure

On average 1000 l/h of alcogel at about 60° C. were introduced at 50 bar via 100 mm wide fittings and via the pressure lock and the star feeder at the top of the drier moving bed. A stream of up to 600 kg/h of isopropanol was heated to above 280° C. with the aid of a pump in a heat exchanger with 100 bar steam and was fed in via a flow distributor at the bottom of the moving bed. Gel at not less than 250° C. was transferred from the drier pneumatically with hot fluid via a second cellular wheel lock into a relief lock or alternately one of the two relief locks.

Stage (e): Separation of Sorbed Gases/Substances

Apparatus

An apparatus as shown schematically in the Figure was used. A 3 m³ silo was used as an apparatus for removing/separating off the sorbed gases/substances.

Procedure

After the discharge pressure lock of the drier had been let down and evacuated, the aerogel granules were discharged into the evacuated silo. There, a gentle nitrogen stream was allowed to flow through the bed at about 30 mbar. This nitrogen stream exchanged the gas atmosphere in the silo ten times per hour. Consequently, the partial pressure of desorbed alcohol was kept low and the desorption was accelerated and completed. The residence time was more than 30 minutes, in order also to remove sorbed gases/substances from the Knudsen pores of the aerogel. If desired or necessary to carry out cooling, the silo was operated at atmospheric pressure and $N_2$ was circulated via a washer.

Final Treatment

The continuous final treatment step was effected by milling and mixing in (blowing in) dopants in a pinned disk mill.

The aerogel granules obtained had a particle size of up to 12 mm, only 2% by volume of the granules having a particle size of less than 2 mm. The mean thermal conductivity $\lambda_{10}$ of the 2–3 mm fraction of the granules was better than 18 mW/(m.K) according to DIN 52616; for the powder, it was 16 mW/(m.K). The transparency of the 2–3 mm fraction was 60% at 1 cm layer thickness. The bulk density according to ISO 3944 was from 70 to 130 g/l. The aerogel was water-repellent and floated on water. The headspace (the gas phase above the bed) of the aerogel was not explosive at 100° C. and was explosive only after one hour at 160° C.

What is claimed is:

1. A process for drying microporous, fluid-containing particles, in which the fluid-containing particles to be dried are fed as a moving bed countercurrently to a drying fluid being miscible with the fluid contained within the particles to be dried at least under the conditions of drying, the interfacial tension of the fluid being reduced in comparison with the interfacial tension of the fluid at room temperature, at near-critical to supercritical pressure of the fluid, of the interfacial tension at room temperature.

2. A process as claimed in claim 1, wherein the fluid-containing particles dried are gels which contain water, $C_1$–$C_6$-alkanols or mixtures thereof as fluid.

3. A process as claimed in claim 1, wherein gels which contain isopropanol as fluid are dried.

4. A process as claimed in claim 1, wherein silica gels are dried.

5. A process as claimed in claim 1, wherein the interfacial tension is reduced by correspondingly increasing the temperature.

6. A process as claimed in claim 1, wherein the drying fluids used are selected from the group consisting of $C_1$–$C_6$-alkanols, $C_1$–$C_6$-ethers, $C_1$–$C_6$-ketones, $C_1$–$C_6$-aldehydes, $C_1$–$C_6$-allkanes, $C_{1-C_6}$-alkenes, $C_1$–$C_6$-esters, $C_1$–$C_6$-amines and carbon dioxide.

7. A process as claimed in claim 1, wherein the drying fluid used is the same as the fluid contained in the microporous particles.

8. The process as claimed in claim 1, wherein the interfacial tension of the fluid at room temperature is from 0 to $\frac{1}{10}$.

9. The process as claimed in claim 1, wherein the interfacial tension of the fluid at room temperature is from 0 to $\frac{1}{20}$.

10. A process for the preparation of microporous, three-dimensionally networked particles by:

(a) preparation of microporous particles containing pore liquid or fluid, (b) optionally, washing off and/or removal of salt from the particles obtained in stage (a) and containing pore liquid, by means of a solvent and/or water, (c) optionally, partial or complete exchange of the pore liquid or of the water or of the solvent in the particles for a fluid selected from the group consisting of alcohols, ethers, aldehydes, ketones, esters, amines, ammonia, sulfur dioxide, nitrogen dioxide, sulfur hexafluoride, alkanes, alkenes and, mixtures of two or more thereof, and carbon dioxide, to obtain microporous, fluid-containing particles, (d) drying of the microporous, fluid-containing particles and (e) optionally, separation of sorbed gases and/or substances from the dried particles from stage (d), wherein stages (b), (c), (d) and (e) are carried out in a moving bed by the countercurrent method, by passing the particles obtained from stage (a) countercurrently to a solvent stream and/or water stream in stage (b), passing the particles countercurrently to the fluid in stage (c), passing the fluid-containing particles to be dried countercurrently to a drying fluid, being miscible with the fluid contained within the particles to be dried at least under the conditions of drying, in stage (d), the interfacial tension of the fluid being reduced, at near-critical to supercritical pressure of the fluid, to 0 to $\frac{1}{20}$ of the interfacial tension of the fluid at room temperature, and the dried particles being passed countercurrently to an inert gas stream in stage (e).

11. A process as claimed in claim 10, wherein the drying in stage (d) comprises a process for drying microporous, fluid-containing particles, in which the fluid-containing particles to be dried are fed as a moving bed countercurrently to a drying fluid, the interfacial tension of the fluid being reduced in comparison with the interfacial tension of the fluid at room temperature, at near-critical to supercritical pressure of the fluid of the interfacial tension at room temperature, wherein the fluid containing particles dried are gels which contain water, $C_1$–$C_6$alkanols or mixtures thereof as fluid.

12. A process as claimed in claim 10, wherein, in stage (c), the pore liquid or the water or the solvent in the particles is first exchanged for a liquid miscible with the pore liquid or with the water or with the solvent and this liquid is then exchanged for the fluid.

* * * * *